(12) United States Patent
Hosick

(10) Patent No.: US 6,182,441 B1
(45) Date of Patent: Feb. 6, 2001

(54) DRIVE CIRCUIT FOR ELECTRIC PROPULSION THRUSTER

(75) Inventor: Daryl K. Hosick, Santa Cruz, CA (US)

(73) Assignee: Space Systems/Loral, Inc., Palo Alto, CA (US)

( * ) Notice: Under 35 U.S.C. 154(b), the term of this patent shall be extended for 0 days.

(21) Appl. No.: 09/497,920

(22) Filed: Feb. 4, 2000

Related U.S. Application Data

(62) Division of application No. 08/950,692, filed on Oct. 15, 1997, now Pat. No. 6,029,438.

(51) Int. Cl.$^7$ .................................................. F03H 1/00
(52) U.S. Cl. ............................ 60/202; 60/203.1; 60/204
(58) Field of Search ........................... 60/202, 203.1, 60/204, 200.1; 219/121.54, 121.57, 130.1; 313/359.1, 360.1

(56) References Cited

U.S. PATENT DOCUMENTS

| 3,304,717 | 2/1967 | Gutton et al. ............................. 60/202 |
| 4,422,013 | 12/1983 | Turchi et al. ......................... 313/359.1 |
| 4,996,407 | 2/1991 | Traxler .............................. 219/121.54 |
| 5,142,861 | 9/1992 | Schlicher et al. ..................... 60/203.1 |
| 5,352,861 | 10/1994 | Steigerwald et al. ................. 60/203.1 |
| 5,359,180 | 10/1994 | Park et al. ............................ 60/203.1 |
| 5,605,039 | 2/1997 | Meyer et al. ......................... 60/203.1 |
| 5,626,315 | 5/1997 | Flament et al. ....................... 244/168 |
| 5,720,452 | 2/1998 | Mutschler, Jr. ........................ 244/173 |
| 6,029,438 | * 2/2000 | Hosick .................................... 60/202 |

* cited by examiner

Primary Examiner—Ted Kim
(74) Attorney, Agent, or Firm—Perman & Green, LLP

(57) ABSTRACT

In drive circuitry for powering an arc jet or ion engine aboard a spacecraft carrying solar panels, a start-up circuit interconnects an array of series-parallel connected solar panels to establish and maintain an arc and plasma in the engine. In the start-up circuit, an electric switch is placed in parallel with an electrode assembly of the engine. One terminal of the engine connects directly with the solar panel array, and another terminal of the engine connects via an inductor to the solar panel array. A capacitor connects across terminals of the solar panel array. A series connection of solar panels increases the voltage from that which is available from a single panel. Conduction of current from the solar panel via the inductor is initiated by the switch to store magnetic energy within the conductor. Thereupon, upon an opening of the switch, the inductor produces a relatively high voltage which strikes an arc in the engine. The voltage outputted by the solar panel array is sufficient to maintain operation of the engine subsequent to the generation of the arc.

3 Claims, 1 Drawing Sheet

DRIVE CIRCUIT FOR ELECTRIC PROPULSION THRUSTER

This application is a Divisional of pending application Ser. No. 08/950,692, filed on Oct. 15, 1997, now U.S. Pat. No. 6,029,438.

BACKGROUND OF THE INVENTION

This invention relates to electric drive circuits for powering spacecraft thrust engines including arc-jet engines and ion engines and, more particularly, to a drive circuit adapted for employing voltages supplied by solar panels of a spacecraft for application directly to the electrodes of the engine.

The engines which drive a spacecraft are in the nature of a thruster emitting a stream of high-velocity particles which accelerate the spacecraft in a desired direction as may be required for adjustment of the spacecraft position or orientation during station keeping, as well as for adjustment of the spacecraft orbit. An arc-jet engine and an ion engine are examples of typical thrusters in common use.

Both the arc-jet and the ion engines employ a gas which is electrically charged by an input power source to produce a plasma of high speed electric particles. In the arc-jet engine, the intense heat of the plasma results in an acceleration of particles out of the mouth of the thruster with a corresponding force being developed against the spacecraft to drive the spacecraft in a desired direction. In the ion engine, an electrode grid structure applies an accelerating voltage to the charged particles to accelerate the particles out of the mouth of the thruster to develop the force which drives the spacecraft in the desired direction.

The operation of such thrust engines requires both high voltage and a relatively low voltage. The high voltage is required to initiate electric conduction through the gas of the engine to produce the plasma. Thereafter, electrical conduction through the plasma can be maintained at the low voltage. The solar panels of a spacecraft are employed for generating the electric power necessary for operation of the thrust engine.

A problem arises in that the voltage outputted by a solar panel is too low for operation of the thrust engine. In the past, this problem has been addressed by interposing a DC-to-DC converter between the power source of the solar panels and the thrust engine to increase the voltage, at which the direct current (DC) is supplied by the solar panels, to a higher voltage suitable for operation of the thrust engine. This has the disadvantage of increasing the weight and the complexity of the electrical equipment carried by the spacecraft in contradiction to the general principle of minimizing the weight and the complexity of spacecraft.

SUMMARY OF THE INVENTION

The foregoing problem is overcome and other advantages are provided, in accordance with the invention, by a spacecraft power system for powering an engine of a spacecraft, wherein the engine is a thrust engine including an arc jet engine or an ion engine. The thrust engine is operated electrically and has a start-up voltage threshold and a running voltage substantially less than the start-up voltage. The spacecraft carries an array of solar panels for applying electric power for operation of the thrust engine.

In accordance with a feature of the invention, in the array of solar panels, at least a plurality of the solar panels are connected by series connection to output a voltage equal to the sum of voltages provided by the series connection of said solar panels. The sum of the voltages is less than the start-up voltage but sufficient to maintain steady-state operation at the running voltage of the thrust engine.

The electric circuitry which drives the thrust engine includes the foregoing series connection of the solar panels plus a start-up circuit which is connected between the array of solar panels and the thrust engine to provide the star-up voltage. The start-up circuit has input terminals for connection across terminals of the array of solar panels and output terminals for connection with the thrust engine. Also included in the start-up circuit is a switch which, upon an opening and a closing of the switch, temporarily boosts the sum of voltages beyond the start-up voltage threshold and allows the sum of the voltages to pass directly from the array of solar panels to the output terminals of the start-up circuit for activation of the thrust engine.

In accordance with the invention, the electric switch is placed in parallel with an electric load presented by the electrode assembly and plasma of the engine. The parallel combination of the switch and the load is connected via an inductor serially between first and second terminals of the input terminal pair of the drive circuit. This enables current to flow from the array of solar panels to the output terminals of the start-up circuit. Preferably, the switch is a semiconductor device such as a transistor which is operated by a pulse generator which places the switch in alternate states of conduction and nonconduction.

Initially, prior to generation of plasma in the engine in the operating procedure, the switch is closed by the pulse generator to be in a stage of conduction, essentially a short circuit, for conducting current through the inductor via the switch. Since there is not yet any plasma, the engine load appears essentially as an open circuit and draws no current. After initiation of the inductor current, the switch is opened by the pulse generator to discontinue conduction of the inductor current. The inductor then generates sufficient voltage to drive the inductor current into the engine load and strike an arc for generating the plasma. The plasma reduces the voltage drop across the load to a value which can be sustained by an array of solar panels. This enables the array of solar panels to continue to supply current via the inductor to the load to maintain the engine thrust.

The plurality of solar panels may be connected in a series-parallel array to output a sufficient magnitude of voltage to sustain the state of plasma in the engine, while providing sufficient current to power other circuits of the spacecraft. A capacitor is connected across the input terminal pair of the start-up circuit to protect the solar panels, as well as other spacecraft circuitry from any voltage spikes which may develop during initiation and termination of the state of plasma in the engine. The inductor also serves, in combination with the capacitor to filter out any electrical noise generated within the engine load. A further switch is connected between the inductor and the array of solar panels to deactivate the start-up circuit upon completion of an engine thrust interval.

BRIEF DESCRIPTION OF THE DRAWINGS

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION

Figure 1:
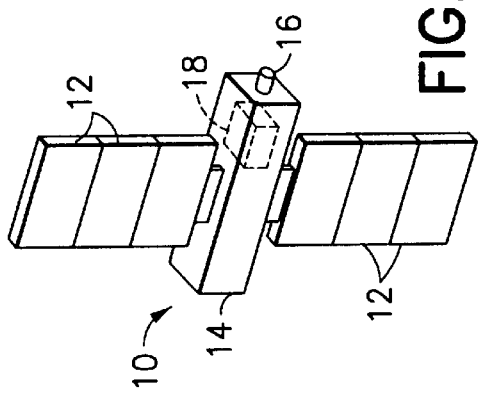
FIG. 1 shows a stylized view of a spacecraft traveling through space with solar panels extended, a thrust system of the spacecraft being constructed in accordance with the invention.

With reference to FIG. 1, a spacecraft 10 is traveling through space with solar panels 12 extending from a body 14 of the spacecraft 10. The solar panels 12 serve for conversion of solar power to electrical power for the powering of electrical circuits on board the spacecraft 10. The spacecraft 10 has an electrically-powered thrust propulsion engine 16 driven by electric circuitry which includes an electric start-up circuit 18, constructed in accordance with the invention, for powering the engine 16. Also included in the spacecraft 10 is a payload such as communication and telemetry equipment, by way of example, which have been deleted from the drawing to simplify presentation of the invention.

Figure 2:
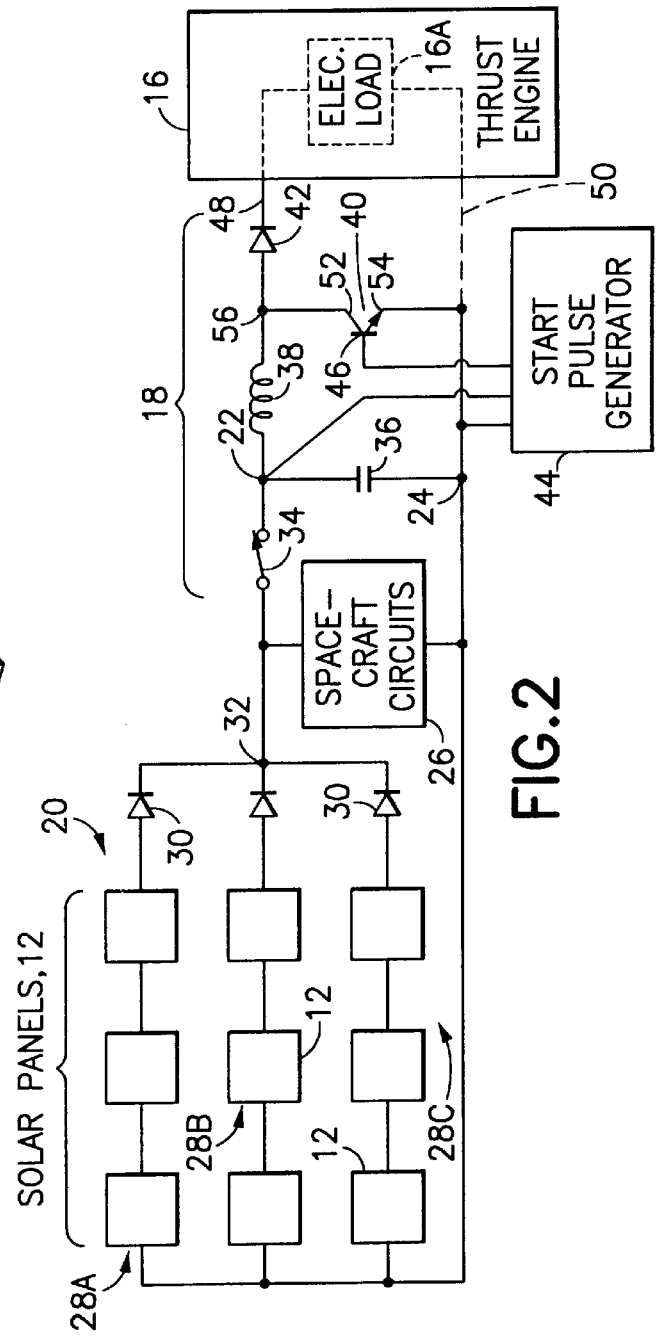
FIG. 2 shows a schematic diagram of electrical circuitry of the invention.

In FIG. 2, the solar panels 12 are connected electrically in a series-parallel array 20 which, in turn, is connected across an input terminal pair of the start-up circuit 18, the input terminal pair comprising a first input terminal 22 and a second input terminal 24. The panel array 20 serves to provide electrical power to the engine 16 via the start-up circuit 18, and also serves to power other circuitry 26 carried by the spacecraft 10.

In the panel array 20, various ones of the panels 12 are connected serially in rows 28A, 28B and 28C which, in turn, are connected in parallel across the terminals 22 and 24. By way of example, the array 20 has the configuration of a square of three columns by three rows for a total of nine panels, it being understood that another number of the panels 12 may be employed and that the array 20 may be rectangular. Each of the rows 28A–C includes a diode 30 for coupling the panels 12 of the respective rows 28A–C to a common junction 32. The diodes 30 conduct electric current in the direction of current flow, as provided by the panels 12, and protect the panels 12 from any reverse voltage spikes which may emanate in either the spacecraft circuitry 26 or in the start-up circuit 18. A power switch 34 serves to connect the panel array 20 to the start-up circuit 18 for powering the engine 16, and for disconnecting the panel array 20 from the start-up circuit 18 for deactivation of the engine 16.

In accordance with the invention, the start-up circuit 18 comprises a capacitor 36, an inductor 38, a transistor 40, a diode 42, and a start pulse generator 44. The pulse generator 44 is connected between the input terminals 22 and 24 to become activated upon a closure of the power switch 34. An output terminal of the pulse generator 44 connects to a base electrode 46 of the transistor 40. The diode 42 and the inductor 38 are serially connected between the first input terminal 22 and a first terminal 48 of an electric load 16A presented by the engine 16. The load 16A represents electric loading by the grid structure and plasma of the engine 16. A second terminal 50 of the electric load 16A is connected directly to the second input terminal 24 of the start-up circuit 18. The transistor 40 is type NPN, by way of example, and further comprises a collector electrode 52 and an emitter electrode 54 with positive current flow from the collector electrode 52 to the emitter electrode 54. The collector electrode 52 connects with a junction 56 between the inductor 38 and the diode 42. The emitter electrode 54 connects with the second input terminal 24. The capacitor 36 connects between the first input terminal 22 and the second input terminal 24.

In operation, upon closure of the power switch 34, direct current flows, in the forward direction of the diodes 30, from the solar panel array 20 into the capacitor 36 until the capacitor 36 is charged with a voltage equal to that outputted by the panel array 20. Power from the panel array 20 also is applied to the pulse generator 44 to activate the generator 44. After the charging of the capacitor 36, the transistor 40 is operated as a switch to provide a state of conduction which is essentially a short circuit upon the application of a start pulse from the pulse generator 44 to the base electrode 46 of the transistor 40. Current flows through the inductor 38 via the transistor 40 back to the solar panel array 20. The electric load 16A presents a much higher impedance to the panel array 20 than does the conducting transistor 40 with the result that essentially all of the inductor current flows through the transistor 40. The magnitude of the current is limited by the internal resistances of the transistor 40 and of the inductor 38, such resistances being deleted from the drawing to simplify the drawing.

After the initial transient in the inductor current, which occurs upon activation of the transistor 40, the inductor current reaches a constant value. Thereupon, the generator 44 terminates the start pulse, and the transistor 40 enters a state of nonconduction. As a result, a sufficiently large voltage is developed across the inductor 38 to strike an arc in the engine 16, thereby to enable the inductor current to continue flowing, but to flow through the plasma of the electric load 16A rather than through the transistor 40. By virtue of the series connection of the solar panels 12 in each of the rows 28A–C, the total voltage generated across any one of the rows of solar panels is equal to the sum of the voltages of the solar panels 12 in that row. The total available current provided by the solar panel array 20 is equal to the sum of the currents of the individual rows. In accordance with the invention, the voltage outputted by the solar panel array 20 to the input terminals 22 and 24 of the start-up circuit 18, and the total current available from the array 20 is sufficient to maintain current flow through the plasma of the load 16A. Thus, by virtue of the inductance of the inductor 38 and the switching action of the transistor 40, the solar panel array 20 provides sufficient voltage both to strike an arc and to maintain plasma current for operation of the engine 16.

The diode 42 insures that current flows in only one direction through the load 16A, even in the presence of electrical noise which might be generated within the plasma. The capacitor 36 protects the solar panels 12 from any jumps in voltage due to the switching of the transistor 40. The combination of the inductor 38 with the capacitor 36 serves to filter out radio noise generated in the plasma so as to protect operation of the spacecraft circuits 26 and the solar panels 12 from such radio noise. Thereby, the start-up circuit 18 can function safely to power the engine 16 directly from power generated in the solar panels 12.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method for transferring electric power from an array of solar panels on board a spacecraft to a propulsion thrust engine, including an arc jet engine or an ion engine, said method comprising steps of:

arranging said solar panels in a circuit array wherein at least a plurality of said solar panels are connected in series to output a voltage equal to the sum of voltages provided by the series connection of said solar panels;

connecting a capacitor across output terminals of said array of solar panels;

connecting an inductor between a first terminal of said capacitor and a first terminal of said engine;

connecting an electric switch between a second terminal of said capacitor and a junction between said inductor and said engine;

connecting a second terminal of said engine to said second terminal of said capacitor; and drawing current through said inductor via said switch to charge said inductor with stored energy, and opening said switch to force said stored energy into said engine at a sufficiently high voltage for striking an arc in said engine.

2. A method for transferring electric power from an array of solar panels on board a spacecraft to a propulsion thrust engine, including an arc jet engine or an ion engine, said engine having a start-up voltage threshold, said method comprising steps of:

arranging said solar panels in a circuit array wherein at least a plurality of said solar panels are connected by series connection to output a voltage equal to a sum of voltages of the series connection of said solar panels, said sum of voltages being less than said start-up voltage but sufficient to maintain steady-state operation of said thrust engine;

connecting a start-up circuit between said array of solar panels and said thrust engine, said start-up circuit having input terminals for connection across terminals of said array of solar panels and output terminals for connection with said thrust engine;

wherein said start-up circuit comprises a switch which, upon an opening and a closing of the switch, temporarily boosts said sum of voltages beyond said start-up voltage threshold and allows said sum of said voltages to pass directly from said array of solar panels to the output terminals of said start-up circuit; and said method further comprises a step of connecting the output terminals of said start-up circuit to said thrust engine.

3. A spacecraft power system for powering an engine of a spacecraft, said engine being a thrust engine including an arc jet engine or an ion engine, said engine having a start-up voltage threshold, said spacecraft carrying an array of solar panels, said system comprising:

said array of solar panels, wherein, in said array of solar panels, at least a plurality of said solar panels are connected by series connection to output a voltage equal to the sum of voltages provided by the series connection of said solar panels, said sum of voltages being less than said start-up voltage but sufficient to maintain steady-state operation of said thrust engine;

a start-up circuit connected between said array of solar panels and said thrust engine, said start-up circuit having input terminals for connection across terminals of said array of solar panels and output terminals for connection with said thrust engine;

wherein said start-up circuit comprises a switch which, upon an opening and a closing of the switch, temporarily boosts said sum of voltages beyond said start-up voltage threshold and allows said sum of said voltages to pass directly from said array of solar panels to the output terminals of said start-up circuit.

\* \* \* \* \*